United States Patent
Tajan et al.

(10) Patent No.: US 10,378,368 B2
(45) Date of Patent: Aug. 13, 2019

(54) PROPELLER RING MADE OF COMPOSITE MATERIAL FOR A TURBOMACHINE

(71) Applicant: SNECMA, Paris (FR)

(72) Inventors: Sebastien Emile Philippe Tajan, Sucy en Brie (FR); Charles-Henri Michel Marie Derrez, Paris (FR); Anthony Lafitte, Bannost Villegagnon (FR); Cyril Roger Yves Le Pecheur, Grandvillars (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 14/927,672

(22) Filed: Oct. 30, 2015

(65) Prior Publication Data
US 2016/0123162 A1 May 5, 2016

(30) Foreign Application Priority Data

Oct. 31, 2014 (FR) .................................... 14 60505

(51) Int. Cl.
*F01D 7/00* (2006.01)
*F01D 5/30* (2006.01)
(Continued)

(52) U.S. Cl.
CPC ............... *F01D 7/00* (2013.01); *B64C 11/06* (2013.01); *F01D 5/02* (2013.01); *F01D 5/12* (2013.01);
(Continued)

(58) Field of Classification Search
CPC ..... F01D 7/00; F01D 5/02; F01D 5/12; F01D 5/3023; F01D 5/023; F01D 5/3092;
(Continued)

(56) References Cited

U.S. PATENT DOCUMENTS

| 4,334,827 A | * | 6/1982 | Bouiller | F01D 5/282 416/193 A |
| 4,524,499 A | * | 6/1985 | Grimes | B64C 11/26 29/450 |

(Continued)

FOREIGN PATENT DOCUMENTS

| EP | 2 586 701 A2 | 5/2013 |
| FR | 2 567 209 A1 | 1/1986 |

(Continued)

OTHER PUBLICATIONS

French Search Report dated Jun. 30, 2015 in Patent Application No. 1460505 (with English translation of categories of cited documents).

*Primary Examiner* — Jason D Shanske
*Assistant Examiner* — Eric J Zamora Alvarez
(74) *Attorney, Agent, or Firm* — Oblon, McClelland, Maier & Neustadt, L.L.P.

(57) ABSTRACT

A propeller ring of a turbomachine including an annular body substantially coaxial to a principal axis and a plurality of radial housings uniformly distributed about the principal axis, each radial housing being configured to receive a root of a blade, the annular body being made of composite material including a fibrous reinforcement densified by a polymer matrix and further including a plurality of metallic inserts configured to each receive the root of a blade, said metallic inserts being anchored in the composite material of the annular body.

15 Claims, 6 Drawing Sheets

(51) Int. Cl.
*F01D 5/12* (2006.01)
*F01D 5/02* (2006.01)
*B64C 11/06* (2006.01)
*B64C 11/30* (2006.01)

(52) U.S. Cl.
CPC .......... *F01D 5/3023* (2013.01); *B64C 11/306* (2013.01); *F05D 2240/20* (2013.01); *F05D 2240/50* (2013.01); *F05D 2300/603* (2013.01); *Y02T 50/66* (2013.01)

(58) Field of Classification Search
CPC ..... F05D 2260/74; B64C 11/02; B64C 11/04; B64C 11/06; F04D 29/329; F04D 29/362
See application file for complete search history.

(56) References Cited

U.S. PATENT DOCUMENTS

| | | |
|---|---|---|
| 4,747,900 A | 5/1988 | Angus |
| 4,762,466 A | 8/1988 | Bouiller et al. |
| 8,182,222 B2 * | 5/2012 | Perkinson ............... B64C 11/14 416/220 R |
| 2011/0176924 A1 | 7/2011 | Gallet et al. |
| 2012/0020796 A1 | 1/2012 | Carre et al. |
| 2012/0070287 A1 | 3/2012 | Lafont et al. |
| 2012/0148388 A1 * | 6/2012 | Bottome ............... F01D 11/008 415/170.1 |
| 2012/0257975 A1 * | 10/2012 | Boston .................... B64C 11/06 416/147 |
| 2013/0101434 A1 | 4/2013 | Udall et al. |
| 2013/0272893 A1 | 10/2013 | Fabre et al. |

FOREIGN PATENT DOCUMENTS

| | | |
|---|---|---|
| FR | 2 605 586 A1 | 4/1988 |
| FR | 2 641 251 A1 | 7/1990 |
| FR | 2 943 985 A1 | 10/2010 |
| FR | 2 951 435 A1 | 4/2011 |
| FR | 2 962 175 A1 | 1/2012 |
| FR | 2 963 054 A1 | 1/2012 |

* cited by examiner

PROPELLER RING MADE OF COMPOSITE MATERIAL FOR A TURBOMACHINE

FIELD OF THE INVENTION

The present invention relates to the field of propeller rings of a turbomachine having blades with variable pitch. It applies especially and advantageously in the case of unducted propellers ("open rotor" or "unducted fan").

TECHNOLOGICAL BACKGROUND

FIG. 1 illustrates a turbomachine 1 of the type with unducted propellers. It comprises from upstream to downstream, in the direction of airflow shown by arrows F, a compressor 2, an annular combustion chamber 3, a high pressure turbine 6, and two countrarotating low-pressure turbines 8. Each low-pressure turbine 8 is connected to an outer propeller 9, the two propellers being arranged coaxially behind the other about a longitudinal axis A of the turbomachine 1 and each comprising a plurality of blades P uniformly distributed about said axis.

For this purpose, each propeller is fixed on a ring 10 conventionally comprising (FIG. 2) an annular rotor body 11 generally polygonal (known as polygonal ring), centred on the longitudinal axis A of the turbomachine and having a series of radial cylindrical housings 12, distributed uniformly about the axis A, provided to receive the blades of the propeller. Each housing 12 further receives a crown on which the body of a plate adapted to receive the root 14 of a blade P is fixed. This crown is rotatably mounted in the housing 12 receiving it, which adjusts the angular orientation of the blade P.

In conventional terms, the annular bodies 11 are made of metallic materials such as titanium due to its low density and its good mechanical properties. In fact, the annular body 11 undergoes considerable tangential and axial forces under the effect of centrifugal loads due especially to its considerable diameter (around 1600 mm). It is therefore important that the annular body is capable of mechanically resisting the loads applied to it. However, current annular bodies 11 remain relatively heavy.

It has already been proposed to make the annular body 11 from composite material of the fibrous reinforcement type densified by a matrix. Reference could be made especially to document FR 2 992 677, in the name of the applicant, which describes the existence of such rings. It is true that these annular bodies exhibit a considerable gain in mass in comparison with conventional metallic bodies. But in practice the minimal continuity in fibres of the composite material in the annular body does not produce a propeller ring sufficiently mechanically resistant to support centrifugal loads when the turbomachine is operating.

SUMMARY OF THE INVENTION

An aim of the invention is therefore to rectify the problems associated with propeller rings of the prior art by proposing a propeller ring structure having a significant gain in mass relative to the prior art and which is also capable of mechanically resisting deformations due to centrifugal loads.

For this, the invention proposes a propeller ring of a turbomachine comprising an annular body substantially coaxial with a principal axis and a plurality of radial housings uniformly distributed about the principal axis, each radial housing being configured to receive a root of a blade.

The annular body is made of composite material comprising a fibrous reinforcement densified by a polymer matrix and further includes a plurality of metallic inserts, each configured to receive the root of a blade, said metallic inserts being anchored in the composite material of the annular body.

Some preferred though non-limiting characteristics of the propeller ring described hereinabove are the following:

fibres of the fibrous reinforcement of the composite material present a preferential orientation substantially parallel to a tangential direction of the propeller ring, the metallic insert is cylinder of revolution or conical, the metallic insert is cylinder of revolution and further comprises an annular protuberance, said annular protuberance being embedded in the composite material, each housing comprises a radially outer part configured to receive a blade root and a radially inner part, opposite the radially outer part, the annular protuberance extending near the radially outer part, the metallic insert has a substantially elongated cross-section according to a tangential direction of the propeller ring, the fibrous reinforcement comprises fibres of carbon, glass, aramid or ceramic, the matrix comprises polymer of epoxide, bismaleimide or polyimide type and the insert is made of titanium, and the annular body has a polygonal shape.

According to a second aspect, the invention also proposes a propeller comprising a propeller ring as described hereinabove and blades, housed in the radial housings of the propeller ring.

According to a third aspect, the invention also proposes a turbomachine with blades with variable pitch, comprising a propeller ring as described hereinabove. Optionally, the propeller can be unducted.

BRIEF DESCRIPTION OF THE DRAWINGS

Other characteristics, aims and advantages of the present invention will emerge more clearly from the following detailed description, and with reference to the appended drawings given by way non-limiting examples in which:

FIG. 6b is a sectional view of the sector of annular body of FIG. 6a, and FIG. 6c is a plan view of the sector of annular body of FIG. 6a.

DETAILED DESCRIPTION OF AN EMBODIMENT

A propeller 9 and a propeller ring 10 of turbomachine 1 with blades P with variable pitch according to the invention will now be described.

Figure 1:
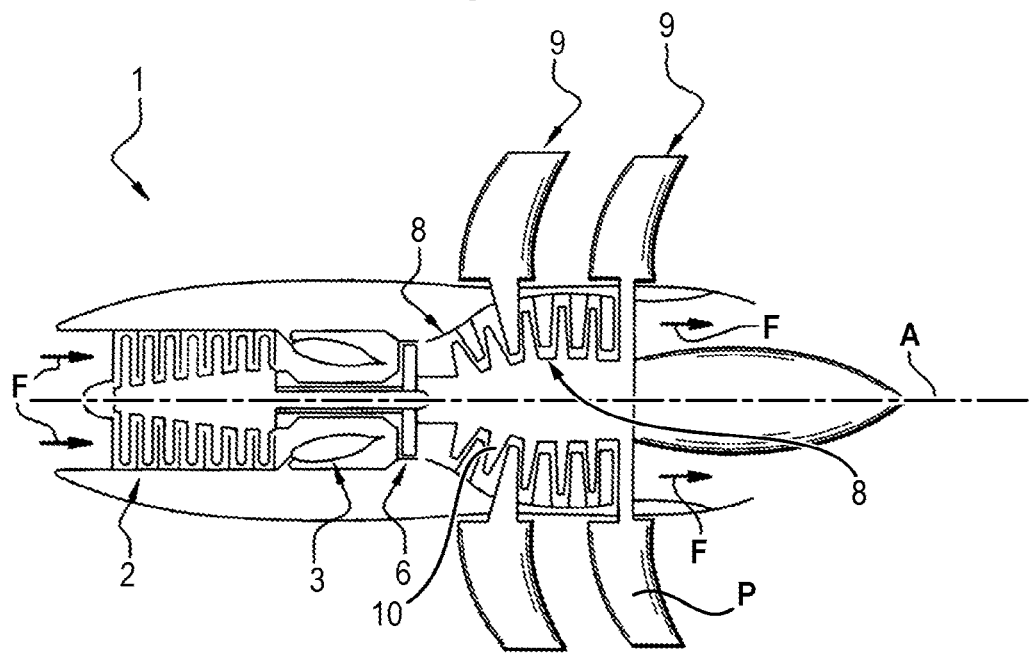
FIG. 1 is a general schematic representation of a turbomachine with unducted propellers, FIG. 2 schematically illustrates a polygonal propeller ring.

A propeller ring 10 according to the invention comprises, as is known per se and as described previously in reference to the appended FIGS. 1 to 3, an annular rotor body 11, centred on the longitudinal axis A of the turbomachine 1 and exhibiting a series of radial housings 12 distributed uniformly about the axis A. Each radial housing 12 is provided to receive a bearing 13 of an associated blade P of the propeller 9, which adjust the angular orientation of the blade P.

For this purpose, each bearing 13 can comprise rollers housed in an inner bearing ring and an outer bearing ring of circular form.

Figure 2:
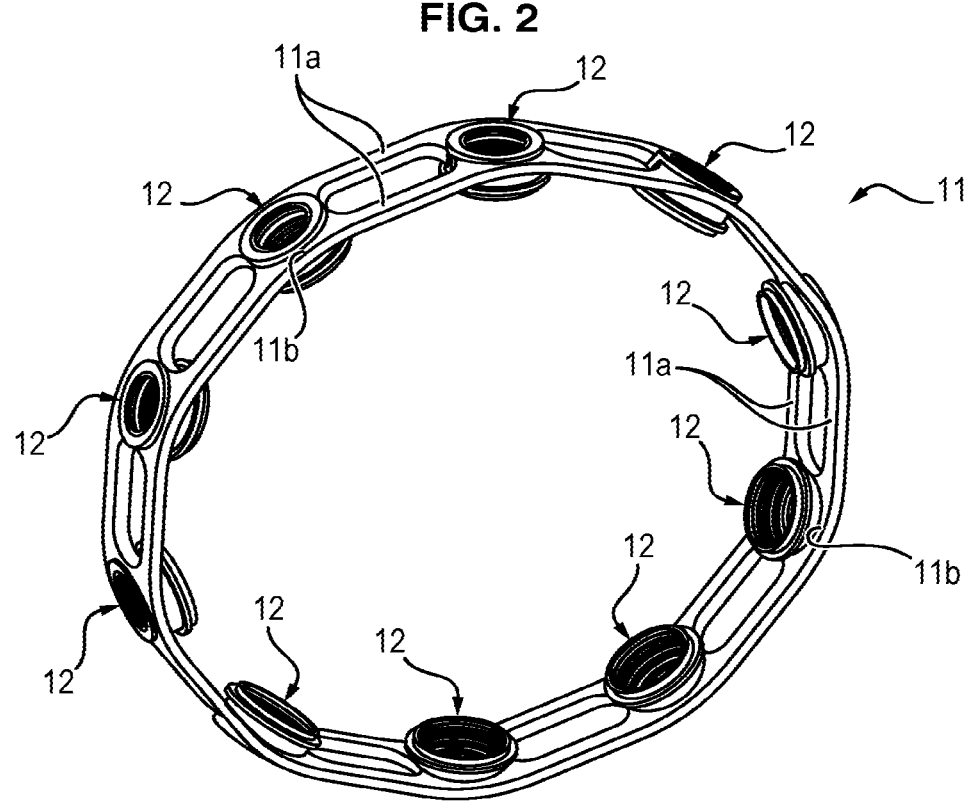
Figure 3:
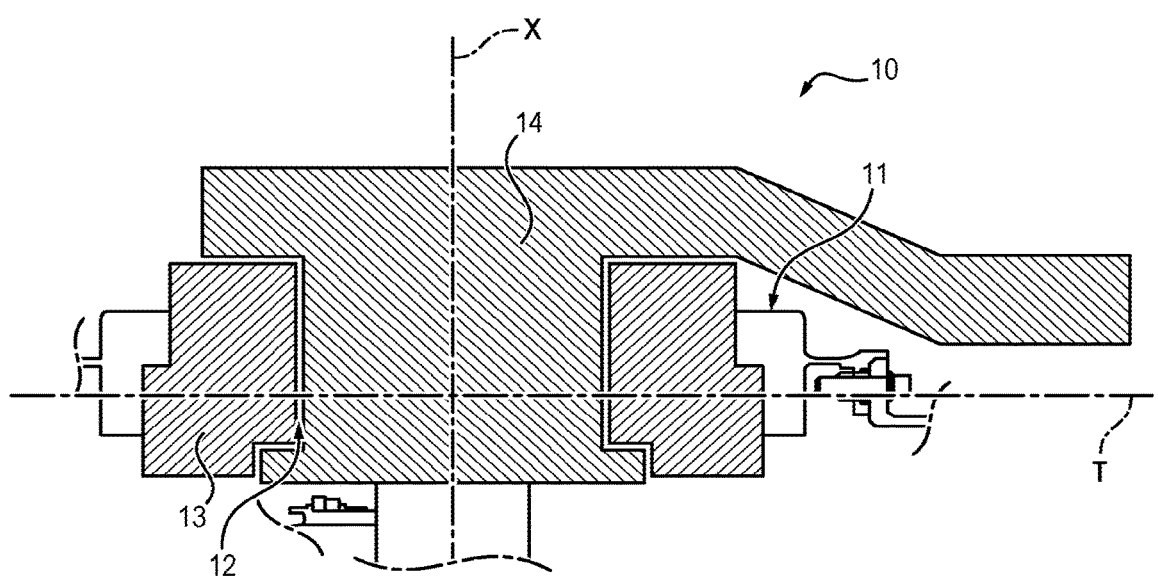
FIG. 3 is a representation in partial section of a propeller module of a conventional open rotor (or unducted fan)

Here, the annular rotor body 11 has a polygonal shape. It comprises receiving parts 11b configured to receive the radial housings 12, joined together by interblade parts P. Each interblade part can comprise two arms 11a substantially parallel and positioned on either side of the radial housings 12 (as illustrated in FIG. 2), or a single arm 11a extending centrally between two adjacent housings (as visible on the sectors illustrated in FIGS. 4a to 6c). But this is not limiting, as the annular body 11 can have any adapted form such as a circular form.

To get significant gains in mass and retain substantial mechanical resistance, the annular body 11 is made of a composite material and comprises a plurality of metallic inserts 20, housed in the composite material and each configured to receive the root 14 of a blade P. Typically, the inter-blade P arm 11a and the receiving parts 11b can be formed from the composite material, the inserts being anchored in a housing formed to this effect in the receiving parts 11b of the annular body 11.

The composite material can for example comprise a fibrous reinforcement densified by a polymer matrix. Typically, the fibrous reinforcement can comprise fibres, especially made of carbon, glass, aramid or ceramic, while the matrix is typically a polymer matrix, for example epoxide, bismaleimide or polyimide. It appears in fact that a polymer matrix is capable of resisting the thermal environment of a propeller ring 10.

Reference could be made especially to document FR 2 913 053 for making the annular body 11 made of composite material. In particular, document FR 2 913 053 proposes forming the fibrous reinforcement by winding in layers superposed on a mandrel a fibrous texture obtained by three-dimensional weaving with evolving thickness.

Preferably, the fibres of the fibrous reinforcement of the composite material have a preferred orientation substantially parallel to a tangential direction of the propeller ring 10 to best absorb the centrifugal forces applied to the annular body 11. Tangential direction here means a direction extending along an axis tangential to a radially outer surface of the annular body 11 extending in a plane perpendicular to the axis A.

The metallic insert 20 can also be made of titanium due to its low density and its good mechanical resistance.

In comparison with propeller rings 10 of the prior art, the annular body 11 has less density due to using the composite material. Also, anchoring metallic inserts 20 in the composite material at the level of the radial housings 12 ensures sufficient continuity of the fibres of the composite material to guarantee the mechanical resistance of the propeller ring 10 and effectively absorb forces at the level of the roller of the roots 14 of blade P and distribute the loads in the annular body 11 via the composite material. Finally, the metallic inserts 20 are simple to make: they can in fact be machined separately and precisely then attached in the part of the annular body 11 made of composite material, if needed with the bearings 13 and the bearing rings of the roots 14 of blade P.

For example, the metallic inserts 20 can be directly integrated into the composite material during manufacture. For this, the fibrous reinforcement can for example be wound and densified by the matrix while the metallic inserts 20 are already in place on the mandrel, ensuring proper positioning and optimal holding of the metallic inserts 20 in the composite material.

Figure 4A:
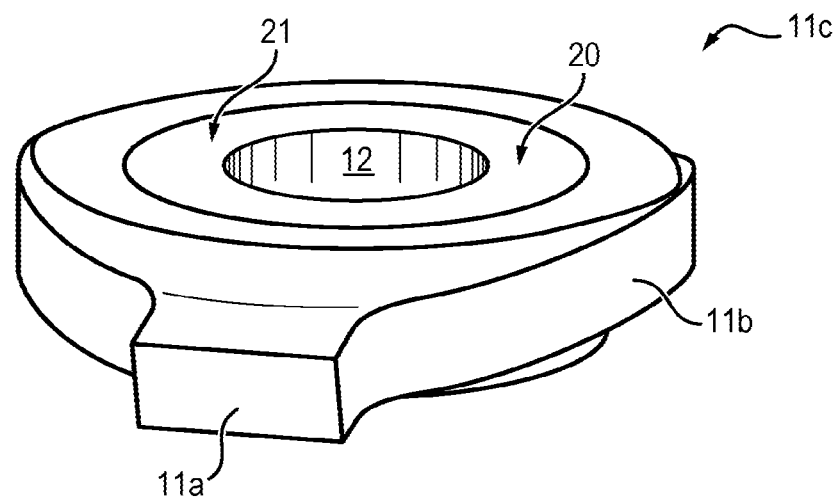
FIG. 4a is a three-dimensional view of a first embodiment of a sector of annular body of a propeller ring.
Figure 4B:
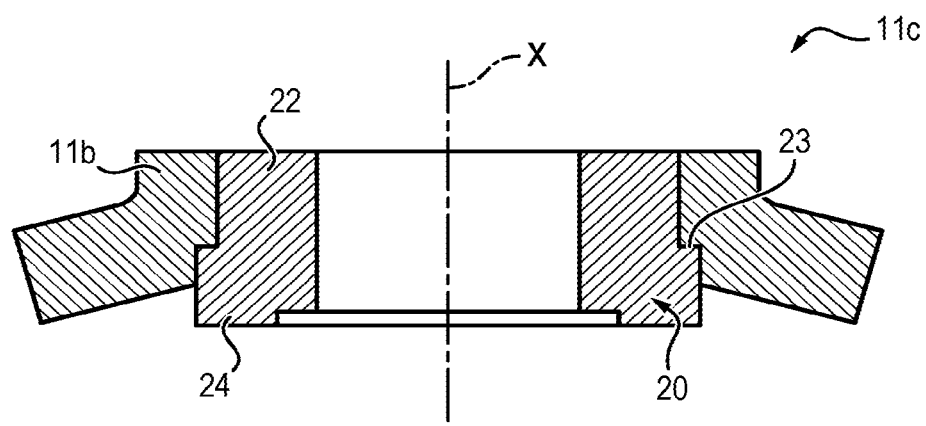
FIG. 4b is a sectional view of the sector of annular body of FIG. 4a, FIG. 5a is a three-dimensional view of a second embodiment of a sector of annular body of a propeller ring.

According to a first embodiment illustrated in FIGS. 4a and 4b, the metallic inserts 20 can have a form substantially as cylinder of revolution about an axis X, for example a substantially tubular form, or a substantially conical form.

In the embodiment illustrated in the figures, a metallic insert 20 according to the first embodiment has a radially outer part 22 of substantially tubular form and having a first outer diameter, and a radially inner part 24 of substantially tubular form, coaxial with the radially outer part 22 and having a second outer diameter. The second outer diameter is larger than the first outer diameter to form a shoulder 23 and enables radial anchoring of the metallic insert 20 in the composite material.

In this embodiment, a radially outer surface 21 of the metallic insert 20 brushes the radially outer surface of the part of the annular body 11 made of composite material.

Such an embodiment produces a metallic insert 20 easy to make with good absorption of forces at the level of the bearings 13. However, the geometry of the interface between the metallic insert 20 and the part made of composite material of the annular body 11 in which it is anchored can cause excessive contact pressures for the composite material. It is possible to adapt the geometry of the annular body 11 made of composite material such that the thickness of material extending about the insert is continuous and constant. For example, it is possible to make a circular roller about the metallic insert 20 then make a change in direction of the fibrous reinforcement to form the adjacent inter-blade P arm 11a and create tangential orientation of the fibres between two adjacent metallic inserts 20.

Figure 5A:
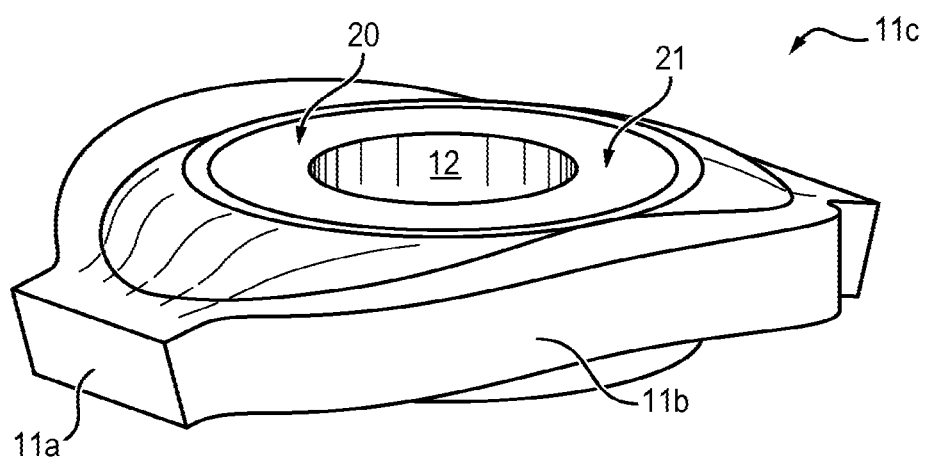
FIG. 5b is a sectional view of the sector of annular body of FIG. 5a, FIG. 5c is a plan view of the sector of annular body of FIG. 5a, FIG. 6a is a three-dimensional view of a third embodiment of a sector of annular body of a propeller ring.
Figure 5B:
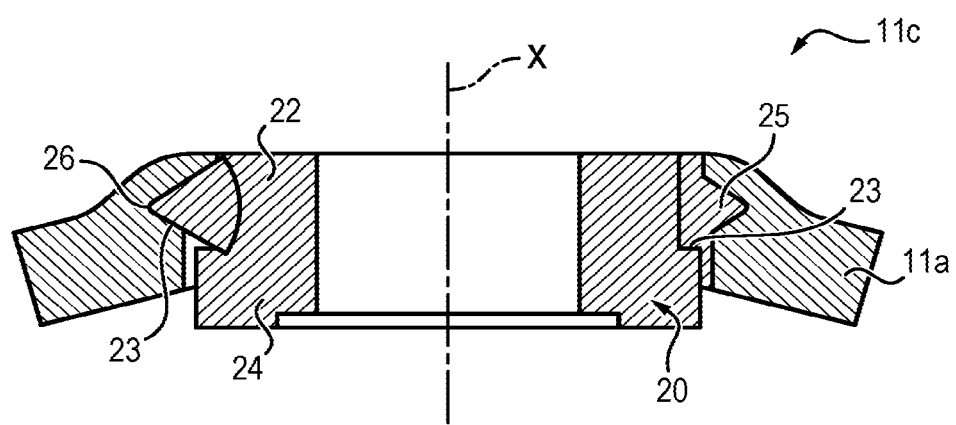
Figure 5C:
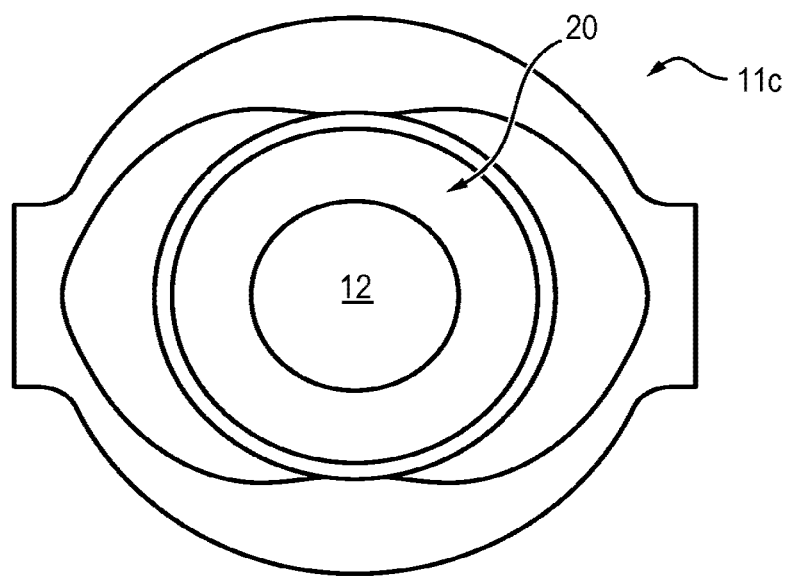

According to a second embodiment illustrated in FIGS. 5a-5c, the metallic insert 20 can have a form substantially as cylinder of revolution or a conical form, and comprise an annular protuberance 25, embedded in the composite material.

Similarly to the first embodiment, the metallic insert 20 has a radially outer part 22 and a radially inner part 24 each having a substantially tubular form of different diameter to form a shoulder 23 for radial anchoring of the metallic insert 20 in the composite material. The annular protuberance 25 is also coaxial to the metallic insert 20 and extends from its radially outer part 22.

The annular protuberance 25 can have an evolving thickness between the radially outer part 22 and its free end 26 which extends away from the radially outer part 22 of the metallic insert 20. For example, the thickness of the protuberance can be greater near the radially outer part 22 than at the level of its free end. Here, the annular protuberance 25 for example has a substantially conical cross-section, whereof the wider part (base of the cone) extends between the radially outer surface of the annular body 11 as far as the shoulder 23.

The annular protuberance 25 forms an anti-tear member capable of distributing centrifugal forces to the part made of composite material of the annular body 11 via caulking forces rather than shearing forces. Using such a protuberance 25 on the one hand distributes forces transmitted by the metallic insert 20 to the composite material and on the other hand ensures the presence of a considerable quantity of material above the annular protuberance 25. Here, too, it is possible to adapt the geometry of the annular body 11 made of composite material such that the thickness of material extending about the insert is continuous and constant, for example by making a circular winding about the metallic insert 20 then making a change in direction of the fibrous reinforcement to form the adjacent inter-blade P arm 11a.

Yet, in comparison with the first embodiment in which the annular insert is substantially devoid of annular protuberance 25, the interface between the metallic insert 20 and the annular body 11 made of composite material is more complex to make due to the presence of the protuberance and the continuity of material between the metallic insert 20 and the composite material is more difficult to ensure at the level of this interface.

Here too, the radially outer surface 21 of the metallic insert 20 brushes the radially outer surface of the part of the annular body 11 made of composite material.

Figure 6A:
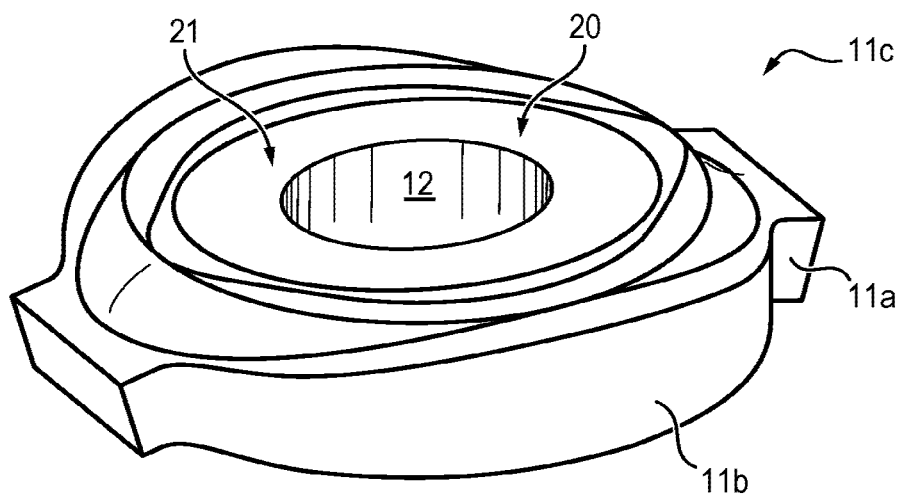
Figure 6B:
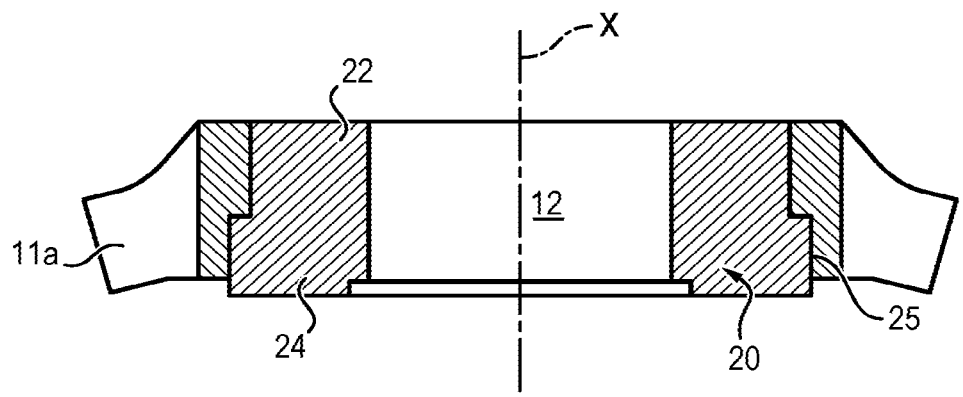
Figure 6C:
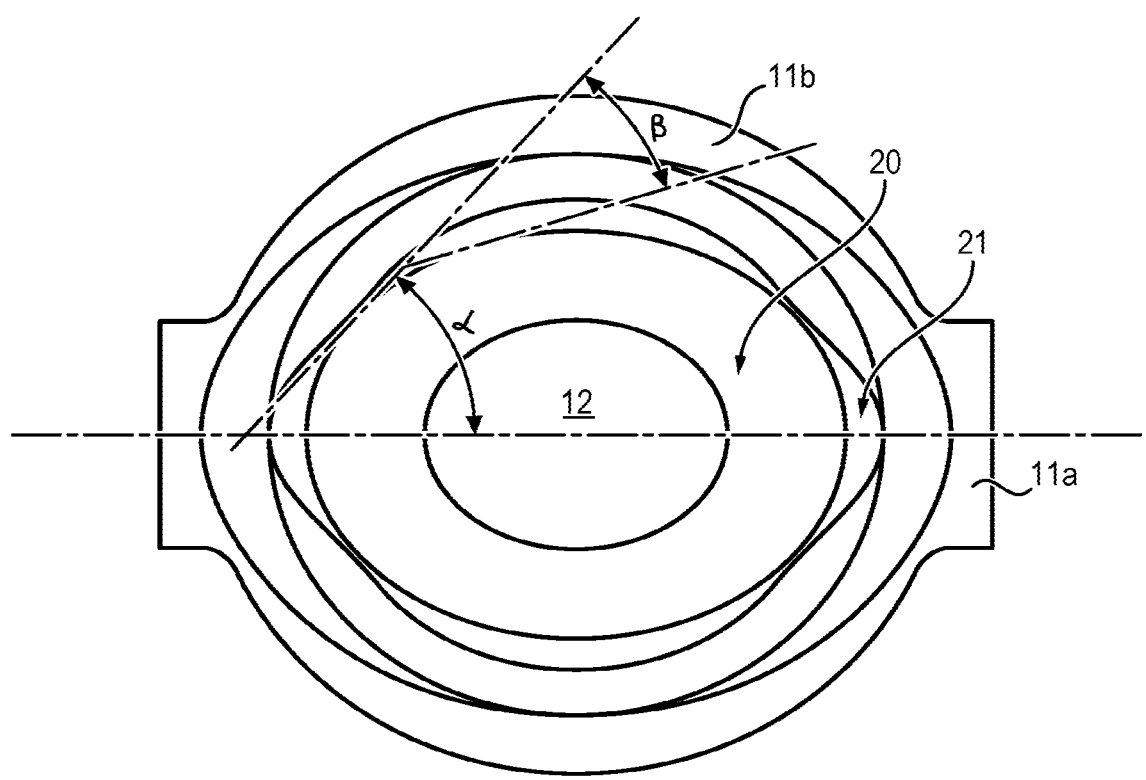

According to a third embodiment illustrated in FIGS. 6a-6c, the metallic insert 20 can be of substantially elongated form in the tangential direction of the propeller ring 10. The geometry of the annular body 11 made of composite material is adapted such that the thickness of material extending about the insert is continuous and constant. This is especially enabled by the substantially elongated form in the tangential direction of the metallic insert, which reduces the angles of attack α, β between the fibres of the composite material and the outer wall of the metallic insert 20 during winding of the fibrous reinforcement about the metallic insert 20 and during change of direction to form the inter-blade P arm 11. Due to this improvement in the continuity of fibres in the composite material, the resistance of the composite material and its sensitivity to tearing outside of plane and/or its resistance to delamination is improved.

In the embodiment illustrated in the figures the metallic insert 20 comprises a radially outer part 22 a radially inner part 24 of substantially cylindrical form. As a variant, the metallic insert 20 can also be conical.

The radially outer part 22 is slightly smaller than the radially inner part 24 to define a shoulder 23 for anchoring the metallic insert 20 in the composite material.

Preferably, the radially outer part 22 and the radially inner part 24 each have a greater dimension in the tangential direction of the ring 10 than in the axial direction of the latter to reduce the excess of composite material in the tangential direction of the annular body 11. Typically, the radially outer part 22 and the radially inner part 24 can have a substantially ovoid cross-section. The thickness of composite material in the vicinity of the metallic insert 20 can be substantially constant, which ensures good continuity of fibres and therefore improves the mechanical resistance of the annular body 11.

However, in comparison with the first embodiment, the interface between the metallic insert 20 and the annular body 11 made of composite material is more complex to make and the continuity of material between the metallic insert 20 and the composite material is more difficult to ensure at the level of this interface.

The annular body 11 can be made in a single piece. As a variant, the annular body 11 can comprise several ring sectors 10x formed separately, which are then assembled to form the annular body 11, as illustrated in FIGS. 4a to 6c. Typically, the annular body 11 can comprise as many ring sectors 10x as radial housings 12, for example between 8 and 13, here twelve.

The gains in mass which can be made due to the three embodiments illustrated in FIGS. 4a to 6c can be from 10% to 50% of the total initial weight, in comparison with a conventional propeller ring 10 made of titanium. Also, the form of the annular body 11 and the introduction of a metallic insert 20 enable adaptation of specific techniques intrinsic to the composite materials.

The invention claimed is:

1. A propeller ring of a turbomachine comprising:
an annular body coaxial to a principal axis and made of a composite material including a fibrous reinforcement densified by a polymer matrix;
a plurality of radial housings uniformly distributed about the principal axis, each radial housing being configured to receive a root of a blade of variable pitch; and
a plurality of metallic inserts each configured to receive the root of the blade of variable pitch, the plurality of metallic inserts being anchored in the composite material of the annular body and including an annular protuberance embedded in the composite material of the annular body, wherein at least one of the plurality of metallic inserts is a cylinder of revolution or conical, and has a geometry enabling the metallic inserts to be attached directly to the annular body and to be held inside the annular body by contact pressure.

2. The propeller ring according to claim 1, wherein fibres of the fibrous reinforcement of the composite material have an orientation parallel to a tangential direction of the propeller ring.

3. The propeller ring according to claim 1, wherein each of the plurality of radial housings includes a radially outer part configured to receive the root of the blade of variable pitch and a radially inner part, opposite the radially outer part, the annular protuberance extending near the radially outer part.

4. The propeller ring according to claim 1, wherein the at least one of the plurality of metallic inserts has a cross-section substantially elongated in a tangential direction of the propeller ring.

5. The propeller ring according to claim 1, wherein
the fibrous reinforcement includes fibres of carbon, glass, aramid or ceramic,
the polymer matrix includes a polymer of epoxide, bis-maleimide or polyimide type, and
the at least one of the plurality of metallic inserts is made of titanium.

6. The propeller ring according to claim 1, wherein the annular body has a polygonal shape.

7. A propeller comprising:
the propeller ring according to claim 1; and
each blade of variable pitch housed in the radial housings of the propeller ring.

8. A turbomachine comprising:
the propeller ring according to claim 1.

9. The turbomachine according to claim 8, wherein the propeller is unducted.

10. The propeller ring according to claim 1, wherein each of the radial housings further receives a bearing configured to adjust an angular orientation of the blade.

11. The propeller ring according to claim 1, wherein a thickness of the annular protuberance gradually decreases between a radially outer part of the at least one of the plurality of metallic inserts and a radially inner part of the annular body extending away from the radially outer part of the at least one of the plurality of metallic inserts.

12. A propeller ring of a turbomachine comprising:

an annular body coaxial to a principal axis and made of a composite material including a fibrous reinforcement densified by a polymer matrix, the annular body including a plurality of radial housings and a plurality of metallic inserts, wherein the plurality of radial housings is uniformly distributed about the principal axis, each radial housing being configured to receive a root of a blade of variable pitch, and each of the plurality of metallic inserts including an annular protuberance embedded in the composite material of the annular body is configured to receive the root of the blade of variable pitch and anchored in the composite material of the annular body and, wherein at least one of the plurality of metallic inserts is a cylinder of revolution or conical, and has a geometry enabling the metallic inserts to be attached directly to the annular body and to be held inside the annular body by contact pressure, wherein a thickness of the annular protuberance at a radially outer part of the at least one of the plurality of metallic inserts is greater than the thickness at a radially inner part of the annular body, opposite the radially outer part of the at least one of the plurality of metallic inserts.

13. The propeller ring according to claim 12, wherein the annular protuberance includes a conical cross-section, wherein a wider part of the annular protuberance extends beyond a radially outer surface of the annular body.

14. The propeller ring according to claim 12, wherein the annular protuberance forms an anti-tear member configured to distribute centrifugal forces to the annular body.

15. The propeller ring according to claim 12, wherein a geometry of the annular body is such that a thickness of material extending about the at least one of the plurality of metallic inserts is continuous and constant.

\* \* \* \* \*